US012458551B1

(12) United States Patent
Wilson et al.

(10) Patent No.: US 12,458,551 B1
(45) Date of Patent: Nov. 4, 2025

(54) STOWABLE INNER LEG SUPPORTS

(71) Applicants: Kevin S. Wilson, San Antonio, TX (US); Eric W. Barta, Castle Hills, TX (US); Christopher T. Niederkrom, San Antonio, TX (US)

(72) Inventors: Kevin S. Wilson, San Antonio, TX (US); Eric W. Barta, Castle Hills, TX (US); Christopher T. Niederkrom, San Antonio, TX (US)

(73) Assignee: Turn Medical, LLC, San Antonio, TX (US)

( * ) Notice: Subject to any disclaimer, the term of this patent is extended or adjusted under 35 U.S.C. 154(b) by 666 days.

(21) Appl. No.: 17/723,143

(22) Filed: Apr. 18, 2022

Related U.S. Application Data

(60) Provisional application No. 63/176,126, filed on Apr. 16, 2021.

(51) Int. Cl.
*A61G 7/005* (2006.01)
*A61G 7/10* (2006.01)

(52) U.S. Cl.
CPC ........... *A61G 7/005* (2013.01); *A61G 7/1025* (2013.01); *A61G 7/1096* (2013.01)

(58) Field of Classification Search
CPC .... A61G 7/008; A61G 2210/50; A61G 7/001; A61G 13/1295; A61G 7/005; A61G 7/1025; A61G 7/1096; A61G 7/1082; A61G 7/1098; A61G 7/0526; A61G 13/12; A61G 13/123; A61G 13/1245; A61G 13/125; A61G 13/128; A61G 13/1285; A61F 5/3761; A61F 5/3769; A61H 2001/0248; A61H 2001/0251; A47C 20/021
See application file for complete search history.

(56) References Cited

U.S. PATENT DOCUMENTS

| | | | | |
|---|---|---|---|---|
| 2,472,675 | A * | 6/1949 | Mueller | A61G 13/009 5/624 |
| 3,681,797 | A | 8/1972 | Messner | |
| 4,175,550 | A | 11/1979 | Leininger et al. | |
| 4,207,879 | A | 6/1980 | Safadago et al. | |
| 4,391,009 | A | 7/1983 | Schild | |
| 4,545,573 | A | 10/1985 | Murphy | |
| 4,729,598 | A | 3/1988 | Hess | |
| 4,866,796 | A | 9/1989 | Robinson et al. | |
| 4,947,496 | A | 8/1990 | Connolly | |
| 5,152,024 | A * | 10/1992 | Chrones | A61G 7/008 5/624 |

(Continued)

FOREIGN PATENT DOCUMENTS

| | | | | |
|---|---|---|---|---|
| CA | 2518029 | | 6/2006 | |
| CN | 101594805 A | * | 12/2009 | B64D 11/04 |

(Continued)

*Primary Examiner* — Justin C Mikowski
*Assistant Examiner* — Amanda L Bailey
(74) *Attorney, Agent, or Firm* — Pizarro Allen PC

(57) ABSTRACT

A therapeutic proning bed include an inner leg support system adjustable between a deployed position and a stowed position. The inner leg support system may, for example, be internally stowed when performing adjustment between the deployed and stowed position. In some embodiments, the inner leg support system may be adjusted between a deployed and stowed position without removal from the bed.

11 Claims, 6 Drawing Sheets

(56) References Cited

U.S. PATENT DOCUMENTS

| | | | | |
|---|---|---|---|---|
| 5,249,320 | A | 10/1993 | Moretz | |
| 5,299,334 | A * | 4/1994 | Gonzalez | A61G 7/005 5/624 |
| 5,412,821 | A | 5/1995 | Wilkinson | |
| 5,487,196 | A | 1/1996 | Wilkinson | |
| 5,794,288 | A | 8/1998 | Soltani | |
| 5,870,785 | A | 2/1999 | Hoorens | |
| 5,882,349 | A | 3/1999 | Wilkerson | |
| 5,926,884 | A | 7/1999 | Biggie | |
| 6,065,165 | A | 5/2000 | Delk | |
| 6,108,838 | A | 8/2000 | Connolly | |
| 6,212,718 | B1 | 4/2001 | Stolpmann | |
| 6,282,736 | B1 | 9/2001 | Hand | |
| 6,367,106 | B1 | 4/2002 | Gronsman | |
| 6,499,160 | B2 | 12/2002 | Hand | |
| 6,526,610 | B1 | 3/2003 | Hand | |
| 6,566,833 | B2 | 5/2003 | Bartlett | |
| 6,609,260 | B2 | 8/2003 | Hand | |
| 6,619,382 | B1 | 9/2003 | Ichigaya | |
| 6,671,905 | B2 | 1/2004 | Bartlett | |
| 6,691,347 | B2 | 2/2004 | Hand | |
| 6,701,553 | B1 | 3/2004 | Hand | |
| 6,701,556 | B2 | 3/2004 | Romano | |
| 6,715,169 | B2 | 4/2004 | Niederkrom | |
| 6,728,983 | B2 | 5/2004 | Bartlett | |
| 6,817,363 | B2 | 11/2004 | Biondo | |
| 6,862,759 | B2 | 3/2005 | Hand | |
| 6,862,761 | B2 | 3/2005 | Hand | |
| 6,874,181 | B1 | 4/2005 | Vijayendran | |
| 6,934,986 | B2 | 8/2005 | Krywiczanin | |
| 6,934,987 | B2 * | 8/2005 | Newkirk | A61G 13/12 5/607 |
| 7,017,211 | B2 | 3/2006 | Krywiczanin | |
| 7,137,160 | B2 | 11/2006 | Hand | |
| 7,191,480 | B2 | 3/2007 | Romano | |
| 7,191,482 | B2 | 3/2007 | Romano | |
| 7,219,379 | B2 | 5/2007 | Krywiczanin | |
| 7,234,178 | B2 * | 6/2007 | Qi | A61G 7/001 5/604 |
| 7,322,059 | B2 | 1/2008 | Hornbach | |
| 7,455,744 | B2 | 11/2008 | Mileti | |
| 7,469,432 | B2 | 12/2008 | Chambers | |
| 7,469,436 | B2 | 12/2008 | Meyer | |
| 7,472,440 | B2 | 1/2009 | Bartlett | |
| 7,478,869 | B2 | 1/2009 | Lazanja | |
| 7,480,953 | B2 | 1/2009 | Romano | |
| 7,578,552 | B2 | 8/2009 | Bajic | |
| 7,617,555 | B2 | 11/2009 | Romano | |
| 7,712,164 | B2 | 5/2010 | Chambers | |
| 7,914,611 | B2 | 3/2011 | Vrzalik | |
| 7,937,791 | B2 | 5/2011 | Meyer | |
| 7,966,680 | B2 | 6/2011 | Romano | |
| 7,992,239 | B2 | 8/2011 | Hornbach | |
| 8,011,041 | B2 | 9/2011 | Hann | |
| 8,118,920 | B2 | 2/2012 | Vrzalik | |
| 8,372,182 | B2 | 2/2013 | Vrzalik | |
| 8,601,620 | B2 | 12/2013 | Romano | |
| 8,856,993 | B2 | 10/2014 | Richards | |
| 8,893,338 | B2 | 11/2014 | McCausland | |
| 8,997,287 | B2 | 4/2015 | Lanning | |
| 9,009,892 | B2 | 4/2015 | Lachenbruch | |
| 9,131,780 | B2 | 9/2015 | Lachenbruch | |
| 9,254,231 | B2 | 2/2016 | Vrzalik | |
| 9,433,300 | B2 | 9/2016 | Gibson | |
| 9,462,893 | B2 | 10/2016 | Romano | |
| 9,463,124 | B2 | 10/2016 | Lachenbruch | |
| 9,538,853 | B2 | 1/2017 | Vrzalik | |
| 9,730,847 | B2 | 8/2017 | Lachenbruch | |
| 9,835,344 | B2 | 12/2017 | Vrzalik | |
| 9,907,408 | B2 | 3/2018 | Vrzalik | |
| 9,913,770 | B2 | 3/2018 | Lachenbruch | |
| 10,172,470 | B1 | 1/2019 | Vrzalik | |
| 10,265,231 | B2 | 4/2019 | O'Reagon | |
| 10,881,570 | B2 * | 1/2021 | Lim | A61G 13/04 |
| 2002/0138905 | A1 | 10/2002 | Bartlett | |
| 2002/0138906 | A1 * | 10/2002 | Bartlett | A61G 7/018 5/609 |
| 2004/0168253 | A1 | 9/2004 | Hand | |
| 2004/0226091 | A1 | 11/2004 | Hand | |
| 2005/0022308 | A1 | 2/2005 | Totton | |
| 2005/0081300 | A1 | 4/2005 | O'Reagan | |
| 2005/0086739 | A1 | 4/2005 | Wu | |
| 2005/0229317 | A1 | 10/2005 | Heiser | |
| 2006/0010608 | A1 | 1/2006 | DeFranks | |
| 2006/0016007 | A1 | 1/2006 | Hornbach | |
| 2006/0112491 | A1 | 6/2006 | Buehner | |
| 2006/0112826 | A1 | 6/2006 | Ichigaya | |
| 2006/0123546 | A1 | 6/2006 | Horton et al. | |
| 2007/0261548 | A1 | 11/2007 | Vrzalik | |
| 2009/0056030 | A1 | 3/2009 | Bolden | |
| 2010/0146709 | A1 | 6/2010 | Lafleche | |
| 2010/0274331 | A1 | 10/2010 | Williamson | |
| 2010/0293713 | A1 | 11/2010 | Sharps et al. | |
| 2011/0024076 | A1 | 2/2011 | Lachenbruch | |
| 2011/0308020 | A1 | 12/2011 | Vrzalik | |
| 2013/0074272 | A1 | 3/2013 | Lachenbruch | |
| 2013/0198955 | A1 | 8/2013 | Lishnevsky | |
| 2013/0212808 | A1 | 8/2013 | Lachenbruch | |
| 2013/0298330 | A1 | 11/2013 | Lachenbruch | |
| 2015/0164728 | A1 | 6/2015 | Kreuzer et al. | |
| 2017/0007482 | A1 | 1/2017 | McKnight | |

FOREIGN PATENT DOCUMENTS

| | | | | |
|---|---|---|---|---|
| CN | 205031506 | U * | 2/2016 | |
| CN | 107744442 | A * | 3/2018 | |
| DE | 202005007453 | U1 | 10/2005 | |
| EP | 1987806 | | 6/2009 | |
| EP | 3424478 | | 1/2019 | |
| WO | 1997018157 | | 5/1997 | |
| WO | WO-2021094955 | A1 * | 5/2021 | A61G 13/0036 |

* cited by examiner

STOWABLE INNER LEG SUPPORTS

CROSS-REFERENCE TO RELATED APPLICATIONS

This application claims priority to U.S. Provisional Patent Application No. 63/176,126 titled "Therapeutic Apparatuses including Stowable Inner Leg Supports" filed Apr. 16, 2021. The full disclosure of the aforementioned patent application is herein fully incorporated by reference.

FIELD

This invention relates to patient abductor support for proning and continuous rotation therapies.

BACKGROUND

Therapeutic beds used for proning therapy may include patient inner leg supports that have hitherto required manual removal to permit transfer of a patient to and from the bed. Manual installation and removal of inner leg supports requires a caregiver to lean over the patient, typically at an awkward angle, so that the caregiver may detach the inner leg support and lift the support out of the way. Inner leg supports are typically heavy and unwieldy, and removal may be obstructed by numerous lines and tubes connecting the patient to medical devices. Manual removal and installation of inner leg supports may thus increase risk of caregiver and patient injury.

There is a need for improved therapeutic beds, tables and the like that may be easily adjusted so as to remove inner leg supports as an obstruction to patient movement so as to facilitate patient movement to or from a support surface. For example, there is a need for stowable inner leg supports for therapeutic beds that do not need to be removed from the bed to allow for patient transfer. There is further a need for a stowable inner leg support for therapeutic beds that may be safely stowed without risk of materials such as a patient clothing or even a patient's skin from becoming entangled or pinched, such as might injure an incapacitated patient, for example.

SUMMARY

In some embodiments, a therapeutic bed may include a rotatable support frame configured for supporting a patient and inner leg supports coupled to the frame. The inner leg supports may be non-removable by a caregiver and adjustable between a deployed position so as to contact an inner portion of each patient leg when the frame engages a patient, and a stowed position so as to substantially clear a path across the frame for moving a patient from the frame.

In some embodiments, a therapeutic bed may include an inner leg support system, the inner leg support system being adjustable so as to prevent the inner leg support system from obstructing a path of patient movement when transferring the patient to or from the therapeutic bed. The therapeutic bed may include a patient support frame including a support surface configured for supporting a patient in a supine position, the support frame being rotatable about a long axis extending from a foot end to a head end of the patient support frame; and an internally stowable pair of inner leg supports, the pair of inner leg supports being adjustable between a working position and a stowed position.

DETAILED DESCRIPTION

This disclosure is directed to patient inner leg supports for therapeutic beds configured for prone therapy. To provide context for describing the structure and function of various embodiments of patient inner leg supports, the disclosure turns first to an overview of an embodiment of a therapeutic bed in which patient inner leg supports may be suitably provided.

Therapeutic Bed

Figure 1:
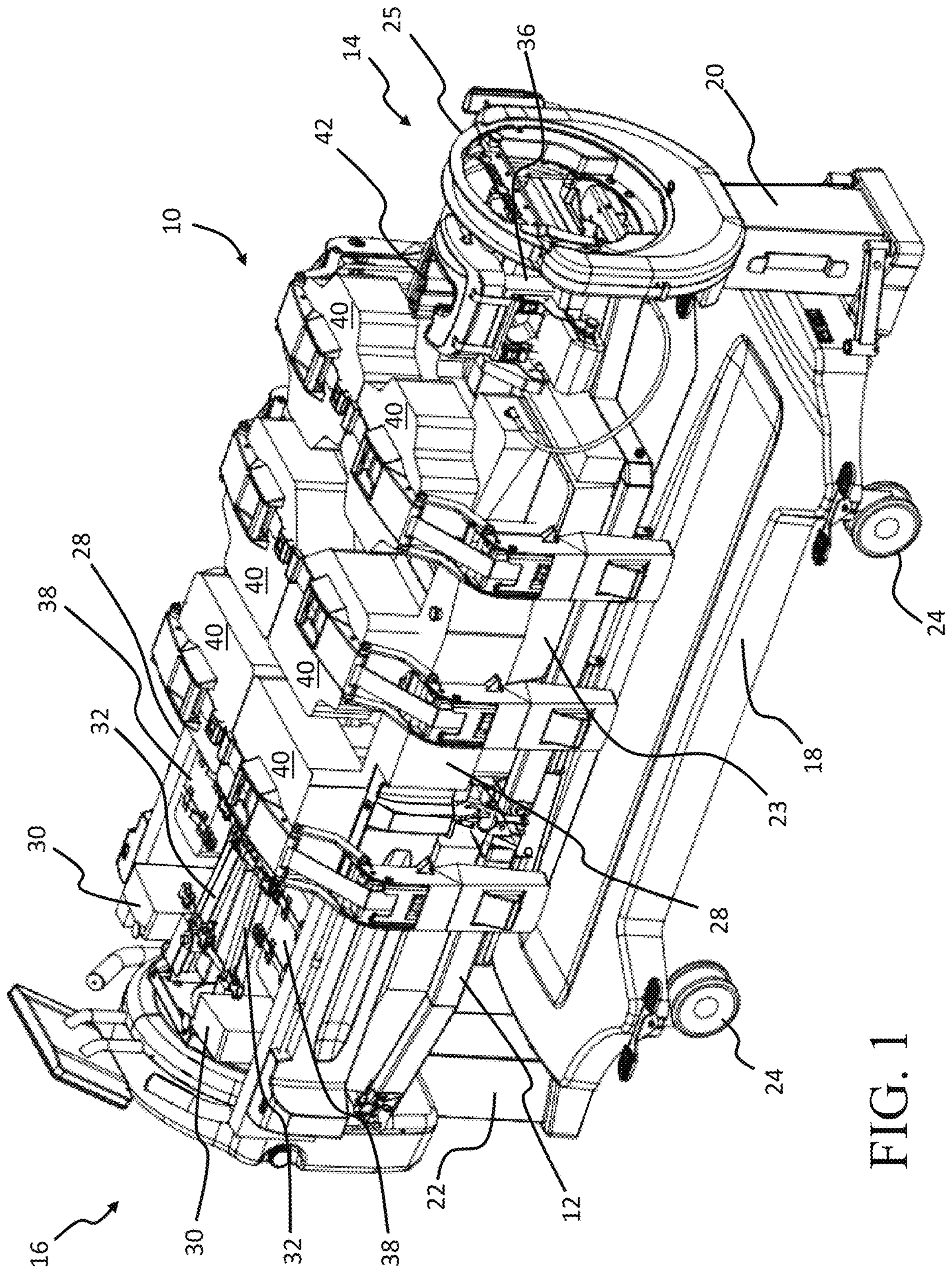
FIG. 1 illustrates an embodiment of a therapeutic bed configured for prone therapy.

FIG. 1 illustrates an embodiment of a therapeutic bed 10 configured to support a patient (not shown) for prone therapy and/or kinetic therapy. Therapeutic bed includes a patient support frame 12 having a head end 14 and a foot end 16. The patient support frame is coupled to a caster frame 18 by a first lift column 20 at the head end and by a second lift column 22 at the foot end 16. The caster frame may be supported by a plurality of casters 24 for bed mobility.

The therapeutic bed embodiment of FIG. 1 may move a patient through primarily two therapeutic modes of movement: a rotational mode and a tilt mode. To provide a rotational mode of movement, the patient support frame may be rotated about a long axis extending through the foot end and the head end of the patient support frame. The rotational mode of movement permits a patient to be rotated from a supine (face up) orientation to a prone (face down) orientation. The rotational mode of movement may further permit a patient to be oscillated through a range of angular positions in either or both of the supine or prone orientations. The rotational mode of movement may further permit 360° rotation, or rotation through more or less than 360°.

To permit rotational movement, the patient support frame may be rotatably coupled to the lift columns. For example, the foot end of the patient support frame may be coupled to lift column 22 by any suitable means, such as through a plate or saddle (not shown). Other suitable means for providing rotatable coupling between the lift column 22 and patient support frame may be used, such as those described in U.S. Pat. No. 6,862,759, for example, which is herein incorporated by reference. The head end of the patient support frame may comprise a hoop 25, which may be coupled to a lift column 20 using any suitable means. For example, the patient support frame may rest on a roller support coupled to a saddle (not shown). A drive system (not shown), such as an electrical motor and drive belt, and electronic controls may be used to selectively rotate the patient support frame. Of course, other suitable means for rotatably coupling the patient support frame and lift column 20 may be used. In some modes of operation, the patient support frame may be manually rotated.

To provide a tilt mode of movement, the length of each lift column may be independently adjusted so as to raise and lower the head end of the patient support frame independently of the foot end, or to raise and lower the foot end of the patient support frame independently of the head end.

Furthermore, the length of each lift column may be adjusted so as to raise or lower the entire patient support frame with respect to the caster frame. That is, the distance between either or both end of the patient support frame and the caster frame may be adjusted. To permit tilt movement, lift column height may be adjusted by any suitable mechanism, such as by hydraulics, screw, ratchet or removable pin.

Patient Constraint

When the patient support frame is oriented to support a patient in a supine position, the patient may rest on one or more patient support pads 23 disposed on the patient support frame 12. The one or more patient support pads 23 may provide a patient support surface 26 to support the patient (shown in FIG. 2, for example). However, when the patient support frame 12 is moved through one or more modes of movement, the patient must be constrained from sliding or falling from the patient support frame. A variety of packs may be provided to constrain a patient during bed movement.

A plurality of lateral packs may constrain the patient's legs, torso, arms and head from lateral movement with respect to the patient support surface. Such lateral packs may include, for example, side support packs 28, foot packs 30, abductor packs 32, and head packs 36. Various embodiments of a patient inner leg support, or abductor support, having abductor packs are described in more detail below. The side support packs 28 may, for example, work individually or with other support packs to help keep a patient from sliding when in supine rotational therapy (e.g., with the patient "face up" and rocking back and forth).

A plurality of prone packs may prevent a patient from falling from the bed when the patient is rotated to a prone position. Such prone packs may include, for example, leg packs 38, torso or thigh packs 40 and a face pack 42.

The term "pack" as used herein refers to a structure that is firm enough to substantially maintain its shape while supporting the patient's body but is also soft so as to comfortably support the patient's body. A pack may, for example, be comprised of a rigid support panel or other structure surrounded by a padding. A pack may be comprised of one or more layers. A pack may comprise a single type of padding. Alternatively, a pack may comprise several different padding materials such as may be used such as to provide a desired level of support in different parts of a pack. For example, a pack may be comprised of materials with more than one spring rate or initial force deflection rating so as to control a level of immersion of the pack around the patient's body. A pack may be shaped to receive a part of the patient's body. For example, a support pack may be generally shaped to contour a patient's legs, forehead, cheeks, or other body part against which it is designed to be disposed. In some embodiments, a pack may be shaped and/or made of materials with controlled properties (e.g., initial force deflection, spring rate, and other properties) so as to reduce any shearing stresses that tend to be formed on the patient's skin when a patient's body is immersed in the pack. A pack may, for example, be filled with a pressurized gas (such as air), foam, a gel, a viscous fluid, or another suitable material.

Patient Access

When the patient support frame is rotated to orient a patient in the prone position, a caregiver may require access to the patient through the patient support frame. The patient support frame may be provided with panels that a caregiver may open to allow access to the patient's body.

Abductor Support

In view of the foregoing context, a more detailed description of various embodiments of patient inner leg supports or abductor supports may now be provided. However, the foregoing embodiments of therapeutic beds and various features and functions thereof should not be interpreted as limiting. Any patient inner leg support as described herein may be used with any therapeutic bed in which a patient may be positioned or placed in a prone or face down position or in which a patient may be treated with rotation therapy.

Figure 2:
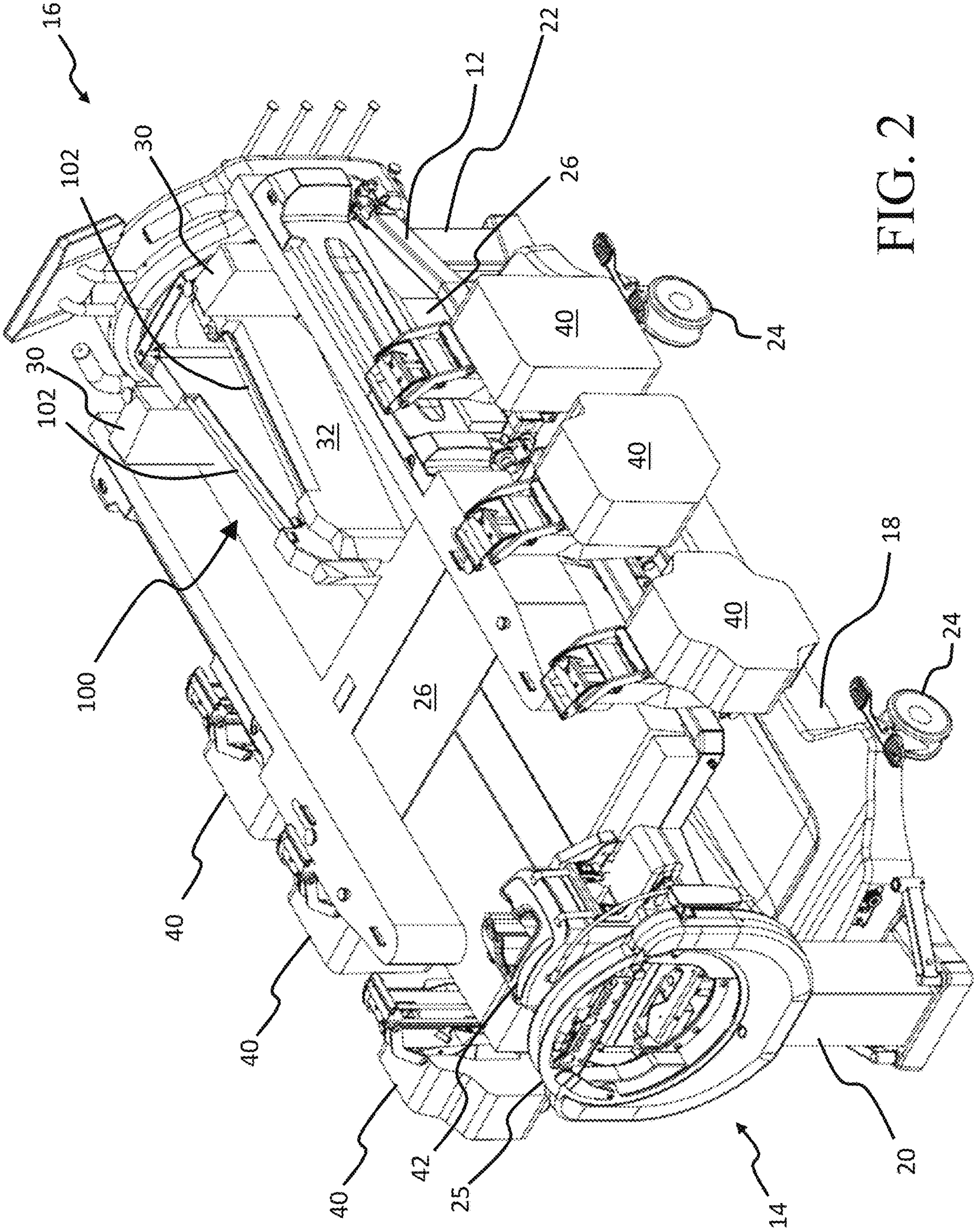
FIG. 2 illustrates the therapeutic bed of FIG. 1 with abductor supports in a deployed position.
Figure 3:
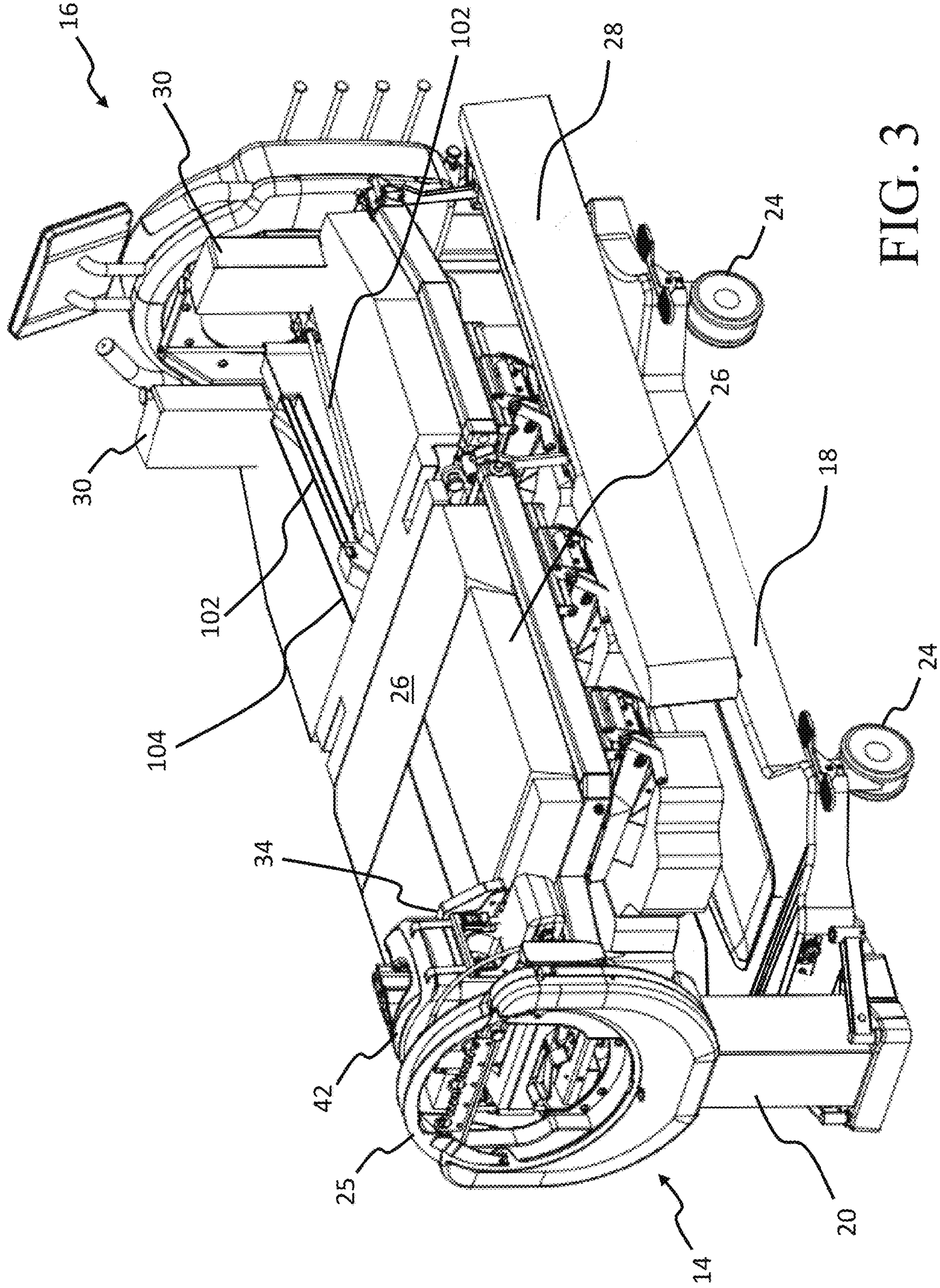
FIG. 3 illustrates the therapeutic bed of FIG. 1 with abductor supports in a stowed position.

As may be more clearly seen in the embodiment of FIG. 2, abductor packs 32 may be coupled to or made part of inner leg supports 100. Inner leg supports 100 may act to constrain a patient's legs (not shown) away from the midline of the patient's body. Accordingly, inner leg supports may sometimes be herein referred to as abductor or abductor supports. The inner leg supports 100 may, for example, comprise a first group and a second group of one or more abductor panels 106 (or abductor packs 32) for supporting, respectively, a patient's right leg and a patient's left leg. The first and second group of abductor panels 106 or abductor packs 32 may be connected together (e.g., fixedly or reversibly, in some embodiments) so that the inner leg supports 100 may act as an integrated unit or assembly. Thus, for example, inner leg supports 100 may be connected so that one or more abductor panels 106 (or abductor packs 32) for supporting the patient's left leg and one or more abductor panels for supporting the patient's right leg may be moved together in tandem as a unit or assembly between a fully deployed position (as shown in FIG. 2) and a stowed position (as shown in FIG. 3). In other embodiments, inner leg supports 100 may comprise separate and independently moveable supports (e.g., panels 106, packs 32, or both) for supporting a patient's legs. The inner leg supports 100 may thus be stowed without removing the inner leg supports 100 from the patient support frame.

In some embodiments, inner leg supports 100 may be partially deployed, i.e., moved to a position between fully deployed and stowed. For example, it may be that in order to best support a patient, the inner leg supports 100 may be moved to a less than a fully extended position. In other words, the inner leg supports 100 may be used in a position wherein either or both of supports for the patient's left leg and/or the patient's right leg are not fully extended. For example, in some embodiments, leg packs 38 may be secured to the inner leg supports 100, such as using one or more bars 102 or other suitable structures, for example. The leg packs 38 may be secured to the inner leg supports 100, and depending, for example, on the width or thickness of the patient's legs, the legs packs may imperfectly support the patient. The inner leg supports 100 may be adjusted (e.g., moved up or down) so as to move the leg packs 38 to achieve a more desired level of engagement with the patient's legs. Either or both of the bars 102 may further be used as handles to assist a caregiver in moving the inner leg supports between a deployed position and a stowed position.

In some embodiments, inner leg supports 100 may comprise an integrated unit or assembly comprising one or more abductor packs shaped so that both of the patient's legs may be supported by the same group of one or more abductor packs. For example, inner leg supports 100 may include one or more abductor packs shaped in the form of a wedge-shaped block which engages both the patient's right leg and the patient's left leg.

In some embodiments, inner leg supports 100 may be configured for independent movement of left-side and right-side supports for a patient's legs. For example, inner leg supports 100 may be configured so that two or more abductor panels 106 and/or abductor packs 32 may be disconnected from each other so that one group of one or more abductor panels 106 and/or abductor packs 32 (i.e., a group of panels and/or packs for supporting the patient's left leg) may be moved independently of another group of one or more abductor panels 106 and/or abductor packs 32 (i.e., a group of panels and/or packs for supporting the patient's right leg). In some embodiments, inner leg supports 100 may comprise each of a first group of one or more abductor panels 106 and/or abductor packs 32 and a second group of one or more abductor panels 106 and/or abductor packs 32 that are independently stowable without having to disconnect first group from the second group.

In some embodiments, inner leg supports 100 may be both stowable and removable from the bed. For example, inner leg supports 100 may be configured so that any connections to the therapeutic bed 10 may be easily disconnected and the inner leg supports 100 removed. Thus, in some embodiments, inner leg supports 100 may be both internally stowable and manually removable from the bed. For example, the inner leg supports 100 may be removed by a caregiver using the caregiver's hands without requiring any other tools. For example, in some embodiments, the inner leg supports 100 may be coupled to the patient support frame 12 using a quick release coupling such as may include one or more pins designed to fit into corresponding apertures in the patient support frame. The inner leg supports 100 may be removable from the patient support frame 12 via disengagement of the quick release coupling, should a caregiver prefer to fully detach the inner leg supports 100. However, the caregiver need not remove the inner leg supports 100 to move a patient from the bed; rather, the inner leg supports 100 may simply be moved to the stowed position.

In a deployed position, inner leg supports 100 may function to safely secure a patient's leg in place while the patient support frame 12 is rotated or tilted during proning therapy. In a stowed position, inner leg supports 100 may be substantially removed from a path of patient movement suitable for transferring a patient onto or off of the patient support surface 26, such as to an adjacent support surface or other medical equipment. The inner leg support 100 may be lowered through an opening 104 (e.g., a gap, notch, hole, or cavity) in the patient support surface 26 and patient support frame so as to retract the inner leg supports to a stowed position such that the top of each inner leg support does not extend above the patient support surface to a degree that would significantly obstruct transverse movement of a patient from the patient support surface. For example, the inner leg support 100 may be retracted to extend only a small amount (e.g., less than about 5 cm) above the patient support surface so that it provides an insignificant barrier against movement of a patient's leg past the inner leg supports.

Figure 4:
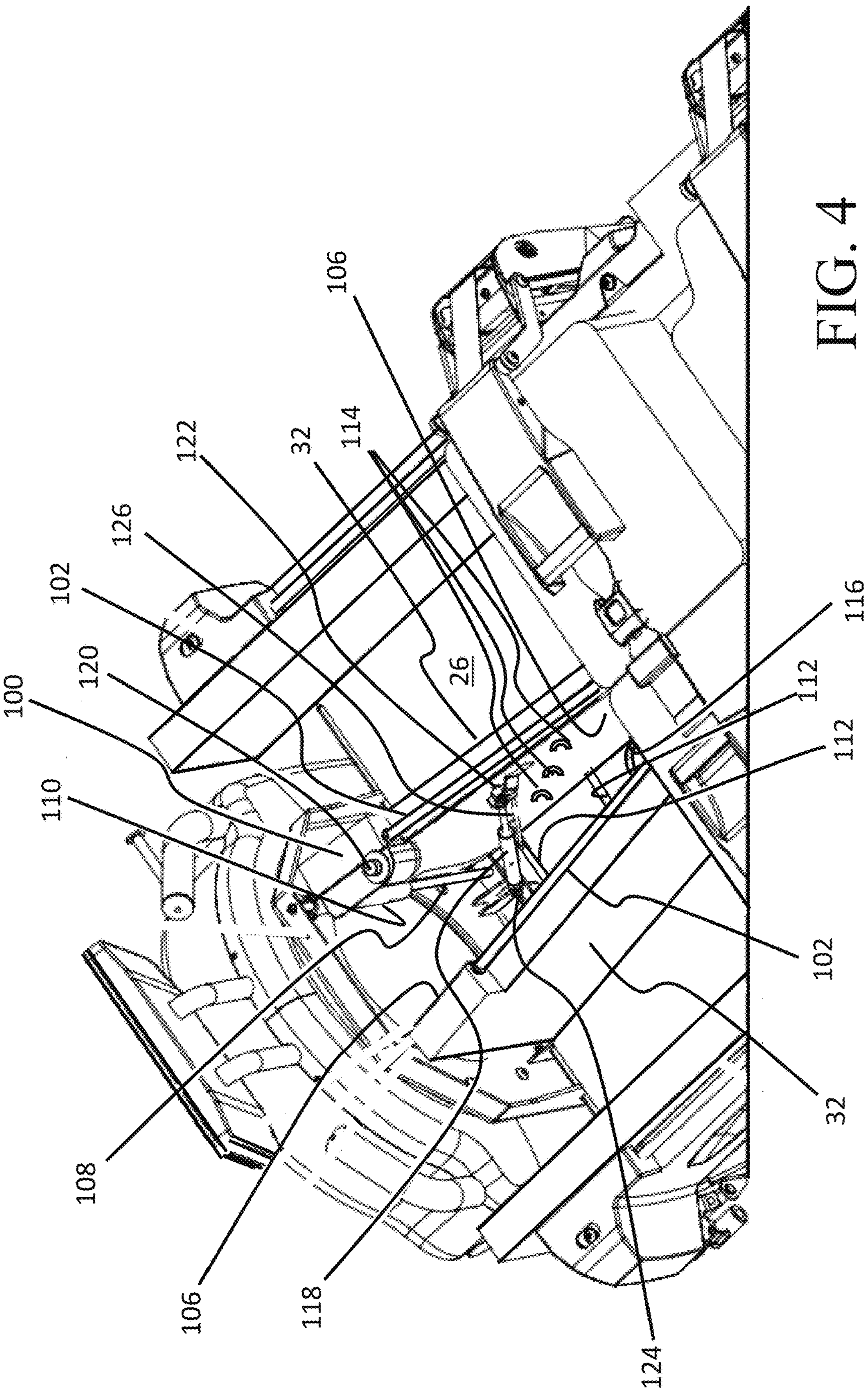
FIG. 4 illustrates further detail of the therapeutic bed of FIG. 1 with abductor supports in a deployed position.

As shown in FIG. 4, inner leg supports 100 may include an abductor panel 106 and abductor pack 32. For example, each of supports for a patient's left leg and for a patient's right leg may include one or more abductor panels 106. In some embodiments, the left-side and right-side portions of the inner leg supports 100 may be oriented so that they are closer together at an end proximal to the patient but more separated at the foot end of the therapeutic bed, near the patient's feet. In this geometry, the left-side and right-side portions of the inner leg supports 100 may together form a "triangular" or "triangular-like" support upon which abductor packs 32 may be mounted so as to provide a softer but secure surface to support the patient's legs during rotation. However, if there is a therapeutic reason to support a patient's legs in another geometry, the abductor supports may be oriented differently.

Figure 5:
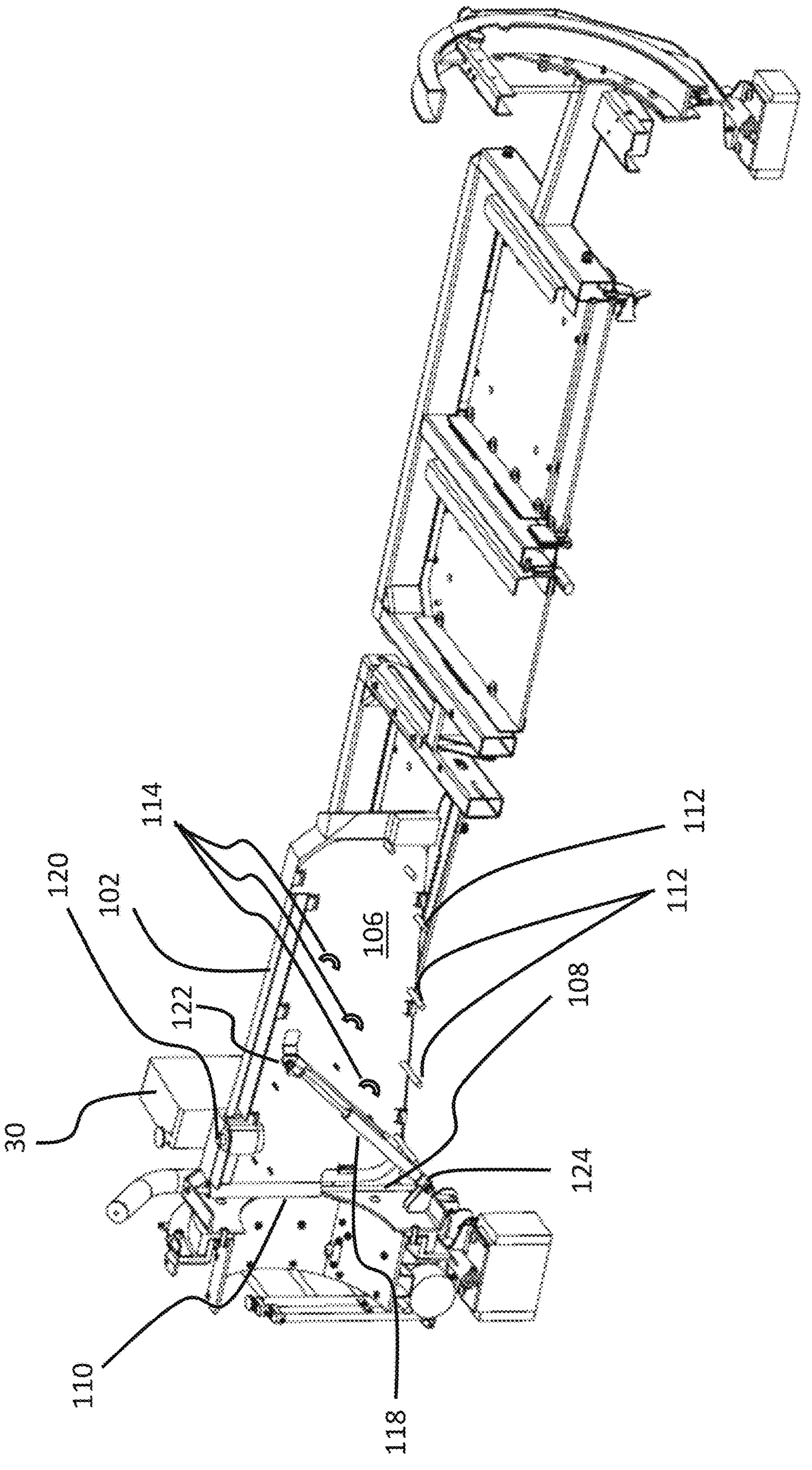
FIG. 5 illustrates a cutaway view of the therapeutic bed of FIG. 1 with abductor supports in a deployed position.

In the embodiment of FIG. 4 and FIG. 5, each of the left-side and right-side portions of the inner leg supports 100 may be slidably coupled to the patient support frame 12 using a rod 108 through a bearing 110. The inner leg supports 100 may slide along the rods 108 to move between a deployed position to a stowed position. As better seen in FIG. 5, a rod 108 may be mounted perpendicular to the patient support frame or at any other suitable angle to the patient support frame. In the embodiment of FIG. 5, the rod 108 is disposed near the foot end of the therapeutic bed but may in other embodiments be disposed at any other location permitting movement of the abductor support between deployed and stowed positions.

In the embodiment shown, the abductor panels 106 may be connected together via one or more rigid connectors 112. Rigidly connecting the abductor panels permits them to be stowed or deployed simultaneously. Accordingly, the abductor panels 106 may be conveniently used as a single component or "assembly." In other embodiments, however, the abductor panels may be operated independently.

Figure 6:
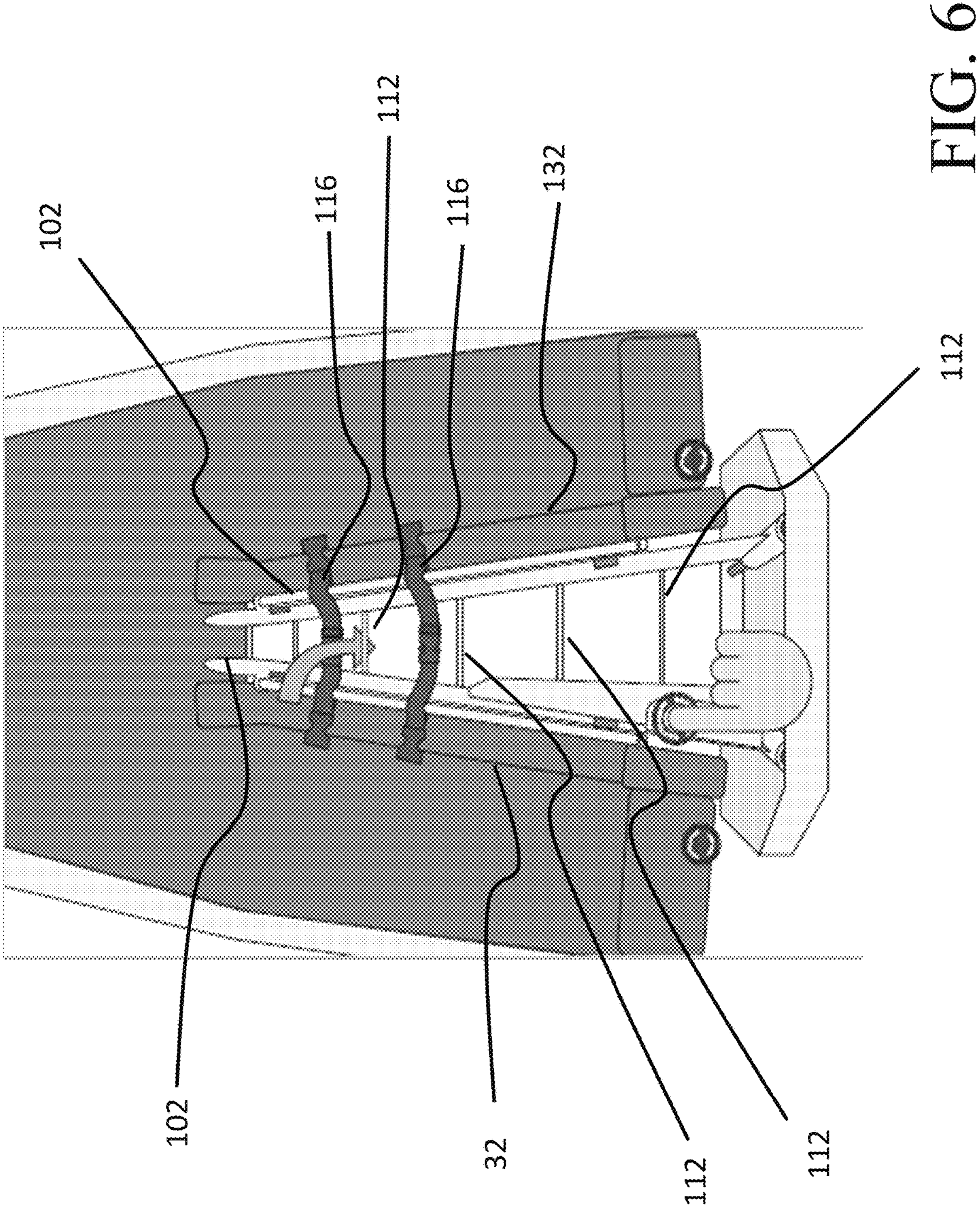
FIG. 6 illustrates operation of a release button to move the abductor supports from a deployed position to a stowed position.

The rigid connectors 112 may also be configured to separate the abductor panels 106, resulting in a gap between the abductor panels. The gap provides access to patient lines as needed. In the embodiment of FIGS. 4 and 5, the connectors 112 are rods. In some embodiments, the rigid connectors 112 may comprise panels. Those other panels may, for example, be used to adjust the size of or control access to the gap between the abductor panels 106. Patient lines may be secured against an abductor panel 106 by straps, clips, brackets or other suitable fasteners 114. In some embodiments, one or more abductor panels 106 may include a compartment or opening so that one or more connectors 112 or other structures may be stored within a panel. Alternatively, as shown in FIG. 6, one or more line securement straps 116 may extend between the abductor panels.

The abductor panels 106 may be moved between stowed and deployed positions by manual operation, assisted manual operation, or powered actuator, motor and gear system, or any other suitable mechanism. In the embodiment of FIGS. 4 and 5, the abductor panels 106 may be moved by assisted manual operation. One or more gas springs 118 may be used to counterbalance the weight of the abductor panels and lock the abductor panels into the desired position. The gas spring may be operated by depressing a release button 120.

In order to "lock out" movement along the rod, the gas spring may be rotatably mounted between a first gas spring pin 122 mounted at the top of one of the abductor panels, and a second gas spring pin 124 mounted to the patient support frame. The gas spring 118 may, for example, include a valve that can be opened or closed by the release button 120 to allow gas to pass from one internal chamber of the gas spring to another. When this valve is opened, the gas spring 118 can be extended or retracted so as to change a gas spring length. When the valve is closed, the gas spring 118 may be held rigidly so that it cannot be extended or retracted. The gas spring 118 may also be configured to provide a desired extension force. This locking feature and extension force allows the abductor panels 106 to be locked into a stowed or deployed position, and to be released for movement between a stowed and deployed position. In the unlocked/movable state, the weight of the inner leg support 100 can be counterbalanced by the extension force supplied by the gas spring 118. Such counterbalancing can make the abductor support at or close to neutral buoyancy so that the abductor support may be easily moved along the rod.

In some embodiments, the gas spring 118 can be activated by a Bowden cable 126, a type of flexible cable that can transmit mechanical force by the movement of an inner cable relative to a hollow outer cable housing. The free end of the Bowden cable 126 can be attached to the release button 120 which allows the valve to be remotely activated via the Bowden cable. For example, as further shown in FIG. 6, the release button 120 may be positioned on the therapeutic bed 10 such that a user may activate the release button with a thumb while using a palm to move the abductor support. A selection lever, knob, button, switch, or other suitable selector may alternatively be used to actuate the gas spring 118.

Thus, when the release button 120 is depressed, the gas spring 118 will permit the abductor panels 106 to move in a controlled manner. In some embodiments, the gas spring 118 may be configured to permit controlled descent of the abductor panels 106 to a stowed position when the patient support frame is oriented to place a patient in a supine position. In various embodiments, such controlled descent may be accomplished either with or without manually-applied force. The gas spring may be further configured to stop movement of the abductor panels if obstructed or hindered, such as by a patient line or a part of the patient's body or clothing. Accordingly, use of a gas spring may prevent caregiver injury from moving the abductor panels, and permit a caregiver to deploy or stow the abductor panels with little effort.

By providing a counterbalancing force to allow for controlled movement of the abductor support, a caregiver may be better able to sense a resistive force should anything become pinched or compressed when the abductor support is being stowed. In some embodiments, a counterbalancing force may be provided that is about constant throughout a selected range of motion. In other embodiments, a counterbalancing force may be varied in some preselected way so that a caregiver may have to provide a force that changes throughout a range of motion when stowing the abductor support.

In yet other embodiments, one or more mechanical springs, dampeners, hydraulics, or weights (e.g., a counterbalancing weight extended over a pulley) may be used to provide a counterbalancing force to the weight of the abductor support. In some embodiments, an actuator (e.g., pneumatic, hydraulic, electric, mechanical or other type) could be used in place of a spring to provide a counterbalancing force or to move the abductor support between stowed and deployed positions. The release button could, for example, electrically activate an actuator, such as a motor and gear train, or a powered hydraulic or pneumatic actuator. Such an actuator could, for example, be used in place of the gas spring shown in FIG. 5.

In some embodiments, adjustable inner leg supports 100 as described herein are not removable by a caregiver, thus eliminating the need for caregivers to keep track of where the inner leg or abductor supports are stored, and also eliminating confusion over installation and removal of removable abductor panels. Further, non-removable inner leg supports 100 may also minimize risk of cross contamination if, for example, a caregiver places the inner leg supports 100 on a floor or other surface that is not sterile or clean.

In some embodiments, a therapeutic apparatus may include inner leg supports which are stowable so as to prevent the inner leg support system from obstructing a path of patient movement when transferring the patient to or from the therapeutic bed. The therapeutic bed may include a patient support frame including a support surface for supporting a patient in a supine position, the support frame being rotatably mounted so that the support frame may be rotated so as to orient the patient in a prone position. The therapeutic bed may further include an internally stowable pair of abductor supports, the pair of supports positioned at a foot end of the support frame and being adjustable between a deployed position and a stowed position.

In some embodiments, a therapeutic apparatus may include a patient support frame including a support surface for supporting a patient in a supine position, the support frame being rotatably mounted; the patient support frame including an opening formed therein; and an inner leg support configured for movement through the opening.

In some embodiments, an abductor support may be coupled to a rod along which the abductor support may traverse to move between deployed and stowed positions. A counterbalancing force may be provided to permit controlled movement of the abductor support.

It is an objective of some embodiments of therapeutic apparatuses herein to provide patient supports suitable for use when proning a patient wherein the supports are not removable from the bed and are fully stowable so as to be removed from a patient path of movement used during patient transfer to or from the apparatus. It is further an objective of some embodiments herein to provide patient supports that are stowable without requiring a caregiver to support a substantial proportion of the weight of the supports. For example, support padding may be at least partially supported during stowing so that a caregiver never has to bear the full weight of the support.

Although the foregoing specific details describe various embodiments, persons of ordinary skill in the art will recognize that various changes may be made in the details of the disclosed subject matter without departing from the spirit and scope of the invention as defined in the appended claims and other claims that may be drawn to this invention and considering the doctrine of equivalents. Among other things, any feature described for one embodiment may be used in any other embodiment, and any feature described herein may be used independently or in combination with other features. Also, unless the context indicates otherwise, it should be understood that when a component is described herein as being mounted or connected to another component, such mounting or connection may be direct with no intermediate components or indirect with one or more intermediate components. Therefore, it should be understood that the disclosed subject matter is not to be limited to the specific details shown and described herein.

What is claimed is:

1. A therapeutic bed comprising:

a rotatable support frame configured for supporting a patient;

a first inner leg support and a second inner leg support slidably coupled to the support frame, the first and second inner leg supports each having a first end and a second end, the first and second inner leg supports each being adjustable between a deployed position so as to contact an inner portion of each patient leg when the support frame engages a patient, and a stowed position without removal from the support frame so as to substantially clear a path across the support frame for moving a patient from the support frame;

a first rod mounted to the support frame, the first end of the first inner leg supports being slidably coupled to the first rod so as to slidably couple the first inner leg supports to the support frame; and a first gas spring coupled between the support frame and at least one of first inner leg support and the second inner leg support, the gas spring being configured to counterbalance a fixed weight of the at least one of the inner leg supports so as to hold the at least one of the inner leg supports in a substantially neutral buoyant state, application of a manual force being required when the at least one of the inner leg supports is moved from a deployed to a stowed position.

2. The therapeutic bed of claim 1 wherein said first and second inner leg supports are abductor supports configured to position the patient's legs away from a midline of the patient's body.

3. The therapeutic bed of claim 1, said first and second inner leg supports being rigidly connected together.

4. The therapeutic bed of claim 3, said first and second inner leg supports being releasably connected together so that a caregiver may move the first and second inner leg supports in tandem or separately from each other.

5. The therapeutic bed of claim 1, the support frame forming an opening through which the first and second inner leg supports may pass when moving the first and second inner leg supports between said deployed position and said stowed position.

6. The therapeutic bed of claim 1, the first gas spring comprising a valve that may open to permit adjustment of gas spring length and may close to prevent adjustment of gas spring length.

7. The therapeutic bed of claim 1, said first and second inner leg supports comprising a pair of independently adjustable inner leg supports, the pair of abductor supports further comprising:

a plurality of abductor packs against which a patient's legs may rest; and a handle by which a caregiver may adjust at least one of the pair of abductor supports between the deployed position and the stowed position.

8. A therapeutic bed including an inner leg support system, the inner leg support system being adjustable so as to prevent the inner leg support system from obstructing a path of patient movement when transferring the patient to or from the therapeutic bed comprising:

a patient support frame including a support surface configured for supporting a patient in a supine position, said support frame being rotatable about a long axis extending from a foot end to a head end of the patient support frame;

an internally stowable pair of inner leg supports, the pair of inner leg supports being adjustable between a working position and a stowed position;

a gas spring coupled between the support frame and at least one of the inner leg supports, the gas spring being configured to counterbalance a fixed weight of the at least one of the inner leg supports, a manual force being required when at least one of the inner leg supports is moved from a deployed to a stowed position;

the support frame forming an opening through which the inner leg supports may pass when moving between said working position and said stowed position;

the pair of inner leg supports being manually adjustable between said working position and said stowed position; and wherein said pair of inner leg supports are supported in a neutrally buoyant state during adjustment between said working position and said stowed position.

9. The therapeutic bed of claim 1 wherein the first gas spring holds the at least one of the inner leg supports in a substantially neutral buoyant state when the at least one of the first inner leg support and the second inner leg support is moved from the deployed position to the stowed position and also holds the at least one of the inner leg supports in a substantially neutral buoyant state when the at least one of the inner leg support is moved from the stowed position to the deployed position.

10. The therapeutic bed of claim 1, the first gas spring having a first end and a second end, the first end of the first gas spring being rotatably coupled to the first inner leg support away from the first end of the first inner leg support, the second end of the first gas spring being rotatably coupled to the support frame away from the first rod so as to dispose the first gas spring out of parallel with the first inner leg support.

11. The therapeutic bed of claim 10, further comprising:

a second rod mounted to the support frame, the first end of the second inner leg supports being slidably coupled to the second rod so as to slidably couple the second inner leg supports to the support frame; and a second gas spring having a first end and a second end, the first end of the second gas spring being rotatably coupled to the second inner leg support away from the first end of the second inner leg support, the second end of the second gas spring being rotatably coupled to the support away from the second rod so as to dispose the second gas spring out of parallel with the second inner leg support.

* * * * *